United States Patent
Keithley

(10) Patent No.: US 10,217,124 B2
(45) Date of Patent: *Feb. 26, 2019

(54) METHOD AND SYSTEM FOR FACILITATING A TRANSACTION

(71) Applicant: PAYPAL, INC., San Jose, CA (US)

(72) Inventor: Thomas H. Keithley, Monkton, MD (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,202

(22) Filed: Feb. 27, 2017

(65) Prior Publication Data

US 2017/0236144 A1    Aug. 17, 2017

Related U.S. Application Data

(63) Continuation of application No. 14/477,813, filed on Sep. 4, 2014, now Pat. No. 9,582,817, which is a
(Continued)

(51) Int. Cl.
*G06Q 40/00*    (2012.01)
*G06Q 30/02*    (2012.01)
(Continued)

(52) U.S. Cl.
CPC ... *G06Q 30/0226* (2013.01); *G06F 17/30867* (2013.01); *G06Q 30/02* (2013.01);
(Continued)

(58) Field of Classification Search
CPC .... G06Q 40/00; G06Q 20/10; G06Q 30/0601; G06Q 30/0241; G06Q 30/0251;
(Continued)

(56) References Cited

U.S. PATENT DOCUMENTS 6,029,141 A    2/2000   Bezos et al.
6,980,962 B1   12/2005  Arganbright et al.
(Continued)

OTHER PUBLICATIONS

Sell-Side Web Sites: What is their potential? Milligan, Brian. Purchasing127.6: S64. Reed Business Information, Inc. (US). (Oct. 21, 1999).*

*Primary Examiner* — Lalita M Hamilton
(74) *Attorney, Agent, or Firm* — Haynes and Boone, LLP

(57) ABSTRACT

Provided is a system for facilitating a transaction between at least one merchant and at least one consumer. The system includes at least one transaction portal located in a network environment, where the at least one transaction portal associated with at least one consumer affinity. The consumer affinity is an entity, a cause, an affiliation, an organization, a concept, a benefit, an association and/or a sponsor or any combination thereof. The system further includes a communication system for facilitating the transmission of data between the transaction portal, the at least one merchant, the at least one consumer, an entity associated with the consumer affinity or any combination thereof. Also provided is a matching system, a method for facilitating a transaction between at least one merchant and at least one consumer and a method for facilitating a credit-based transaction between at least one merchant and at least one consumer.

20 Claims, 2 Drawing Sheets

Related U.S. Application Data continuation of application No. 12/142,387, filed on Jun. 19, 2008, now abandoned.

(51) Int. Cl.
*G06F 17/30* (2006.01)
*G06Q 30/06* (2012.01)
*G06Q 50/10* (2012.01)
*G06Q 20/22* (2012.01)

(52) U.S. Cl.
CPC ..... *G06Q 30/0269* (2013.01); *G06Q 30/0601* (2013.01); *G06Q 40/00* (2013.01); *G06Q 50/10* (2013.01); *G06Q 20/22* (2013.01)

(58) Field of Classification Search
CPC .......... G06Q 30/0276; G06Q 30/0277; G06Q 30/0254; G06Q 30/0255; G06Q 30/0268
See application file for complete search history.

(56) References Cited

U.S. PATENT DOCUMENTS

| | | |
|---|---|---|
| 2002/0082911 A1 | 6/2002 | Dunn et al. |
| 2002/0116282 A1 | 8/2002 | Martin et al. |
| 2002/0188527 A1 | 12/2002 | Dillard et al. |
| 2003/0055727 A1 | 3/2003 | Walker et al. |
| 2005/0004837 A1 | 1/2005 | Sweeney et al. |
| 2006/0041505 A1 | 2/2006 | Enyart |
| 2007/0067297 A1 | 3/2007 | Kublickis |
| 2007/0179847 A1 | 8/2007 | Jain |
| 2008/0033744 A1 | 2/2008 | Jones |
| 2009/0276305 A1 | 11/2009 | Clopp |

\* cited by examiner

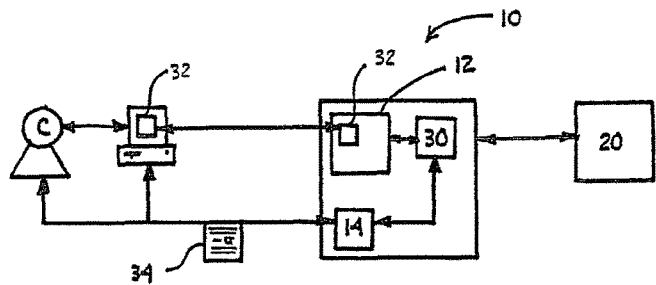
Fig. 4
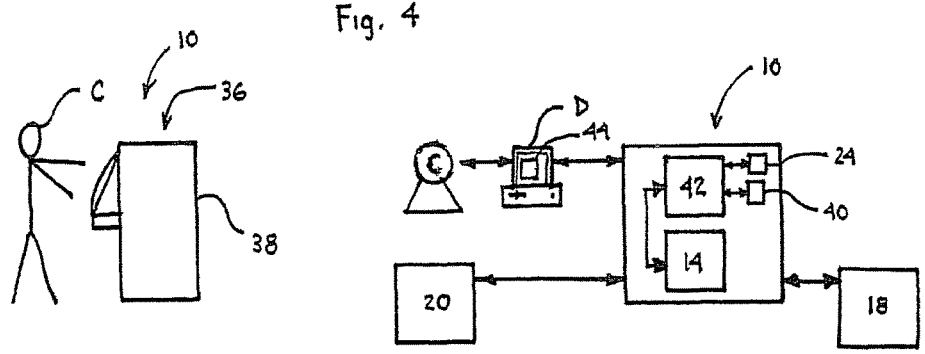
Fig. 5
Fig. 6
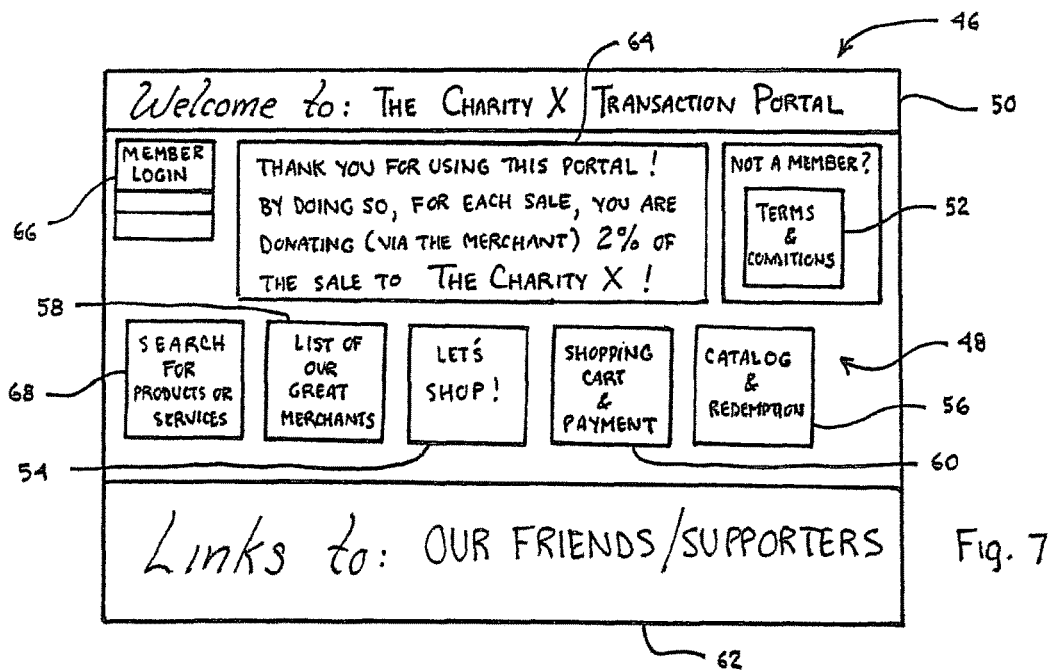
Fig. 7

METHOD AND SYSTEM FOR FACILITATING A TRANSACTION

CROSS-REFERENCE TO RELATED APPLICATIONS

This application is a continuation of Ser. No. 14/477,813, filed on Sep. 4, 2014, which is a continuation of Ser. No. 12/142,387, filed on Jun. 19, 2008, both of which are incorporated herein by reference in their entireties.

BACKGROUND OF THE INVENTION

Field of the Invention

The present invention is directed generally to methods and systems for facilitating a transaction between at least one merchant and at least one consumer, and in particular, to a method and system for facilitating a transaction between at least one merchant and at least one consumer in a network environment, e.g., the Internet.

Description of the Related Art

The lending and credit industries are expanding in the online environment, such as the Internet and the like. This expansion, i.e., the e-tailing market, is facilitated and driven through advertisement, since the point-of-sale ("POS") is a virtual POS. Accordingly, and in order to establish a brand, a focused and targeted advertising plan must be implemented. One such advertising technique is a "viral" advertising approach, which attempts to divert high-value prospective customers to specific clients. These clients pay a service, e.g., Google, to refer valuable, repeat customers to them for business.

Such models may be considered generalized search models, which provide a search box for all users and consumers. Accordingly, while many leads or potential customers are identified using this advertising approach, normally, only a fraction of these potentials lead to a bona fide sale. Further, the online environment may be considered a loose collection of individual brands offered to consumers that already know which brands they like, and where they want to shop. Therefore, obtaining new customers from normal advertising mechanisms is often ineffective.

Presently, the various search engines, e.g., Google, Yahoo, Ask, etc., represent efficient and effective means for creating traffic. However, such engines normally cannot capture or identify specific consumer groups. For example, "high end" consumers typically know what goods or services they desire, and generally where to find them. Such consumers do not normally browse shop using this particular search engine approach.

In response, certain shopping-specific search engines have been developed. These engines allow a consumer to identify merchants to satisfy their specific needs. In addition, these shopping-specific engines allow the consumer to search products and compare brands and prices between these products. However, while effective in assisting the consumer, such an approach does not serve as particularly beneficial to specific merchants. Therefore, required is an advertising approach that is beneficial to consumers, as well as merchants.

In the 1980s, the credit card industry began to shift to branding their credit products. For example, credit cards have been offered that are affiliated with a specific group or entity, e.g., professional groups, a university and/or an alumni association, etc. Consumers obtain and use these cards since they agree with or otherwise support the concept or brand of the card, and in return, the group or entity receives donations or other compensation for endorsing the credit product. While these various groups or entities may offer a credit card branded with their logo or trademark, this does not necessarily lead these consumers to a specific merchant or consumption environment. Therefore, such a model is not an effective advertising mechanism for merchants, particularly online merchants that are attempting to attract high-end leads and actual customers from an enormous group of users.

SUMMARY OF THE INVENTION

Accordingly, it is one object of the present invention to provide a method and system for facilitating a transaction that overcomes the deficiencies and drawbacks of the prior art. It is another object of the present invention to provide a method and system for facilitating a transaction that focuses on specific consumer sets or affiliations. It is a further object of the present invention to provide a method and system for facilitating a transaction that offers valuable leads to merchants and/or assists in the better conversion of leads to actual sales. It is a still further object of the present invention to provide a method and system for facilitating a transaction that targets specified and affiliated consumers and/or benefits specific merchants. It is another object of the present invention to provide a method and system for facilitating a transaction that represents a new advertising mechanism to merchants based upon an affiliated consumer base.

In one embodiment, provided is a system for facilitating a transaction between at least one merchant and at least one consumer. The system includes at least one transaction portal located in a network environment, where the at least one transaction portal is associated with at least one consumer affinity. The consumer affinity is at least one of the following: an entity, a cause, an affiliation, an organization, a concept, a benefit, an association, a sponsor or any combination thereof. The system further includes a communication system for facilitating the transmission of data between the transaction portal, the at least one merchant, the at least one consumer, an entity associated with the consumer affinity or any combination thereof. In a further and non-limiting embodiment, the entity associated with the consumer affinity obtains at least one of the following: a percentage of the transaction amount, a portion of proceeds from the transaction, a donation, a fee, money, a benefit, sponsorship or any combination thereof.

In another embodiment, provided is a matching system, which includes an affinity database including at least one of the following: consumer affinity data, matching data, entity data, cause data, affiliation data, organization data, concept data, benefit data, association data, sponsor data, percentage data, portion data, donation data, fee data, money data, benefit data, sponsorship data or any combination thereof. The system further includes a merchant database comprising at least one of the following: merchant data, credit issuer data, credit product data, consumer affinity data, target data, matching data or any combination thereof; and programming instructions for establishing a relationship between at least one merchant, at least one credit issuer, at least one credit product or any combination thereof and an entity associated with the consumer affinity based upon data in the affinity database and the merchant database.

In a further embodiment, provided is a method for facilitating a transaction between at least one merchant and at least one consumer. The method includes: associating the transaction with at least one consumer affinity comprising at least one of the following: an entity, a cause, an affiliation, an organization, a concept, a benefit, an association, a sponsor or any combination thereof; and, based upon the transaction, providing, to an entity associated with consumer affinity at least one of the following: a percentage of the transaction amount, a portion of proceeds from the transaction, a donation, a fee, money, a benefit, sponsorship or any combination thereof.

In yet another embodiment, provided is a method for facilitating a credit-based transaction between at least one merchant and at least one consumer. The method includes: associating a credit issuer and/or a credit product with at least one consumer affinity including at least one of the following: an entity, a cause, an affiliation, an organization, a concept, a benefit, an association, a sponsor or any combination thereof; associating the transaction with the credit issuer and/or credit product; and, based upon the transaction, providing, to an entity associated with consumer affinity at least one of the following: a percentage of the transaction amount, a portion of proceeds from the transaction, a donation, a fee, money, a benefit, sponsorship or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 4 is a schematic view of another embodiment of a system for facilitating a transaction between a merchant and a consumer according to the principles of the present invention;

FIG. 5 is a schematic view of a kiosk in a still further embodiment of a system for facilitating a transaction between a merchant and a consumer according to the principles of the present invention;

FIG. 6 is a schematic view of yet another embodiment of a system for facilitating a transaction between a merchant and a consumer according to the principles of the present invention; and FIG. 7 is an example screen layout in one embodiment of a system for facilitating a transaction between a merchant and a consumer according to the principles of the present invention.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a method and system 10 for facilitating a transaction between at least one merchant M and at least one consumer C. This system 10 is schematically illustrated in various embodiments in FIGS. 1-6, and an example screen layout is illustrated in FIG. 7. While not limited thereto, the presently-invented method and system 10 can be implemented and utilized in a network environment N, such as online, on the Internet and/or in a system of networked computers D, etc. Therefore, in this implementation, the consumers C (and, optionally, the merchants M) use a computer D to enter and interact within the online or network environment N. In this preferred and non-limiting embodiment, the consumers C and merchants M are operating, interacting, advertising, communicating, transacting ("e-tailing"), etc. in the network environment N.

As discussed hereinafter, the transaction between the merchant M and consumer C may be a credit-based transaction as facilitated by a credit issuer CI. However, the credit issuer CI may be a debit issuer, funder, e.g., a funding institution, bank, etc. in a debit-based transaction. Additionally and as also discussed hereinafter, a consumer affmity may include an entity E. This consumer affinity may also comprise or constitute a cause, an affiliation, an organization, a concept, a benefit, an association and/or a sponsor, etc. It is to be understood that, as discussed hereinafter, the entity E represents the embodiment or construct that is associated with the consumer affinity.

Figure 1:
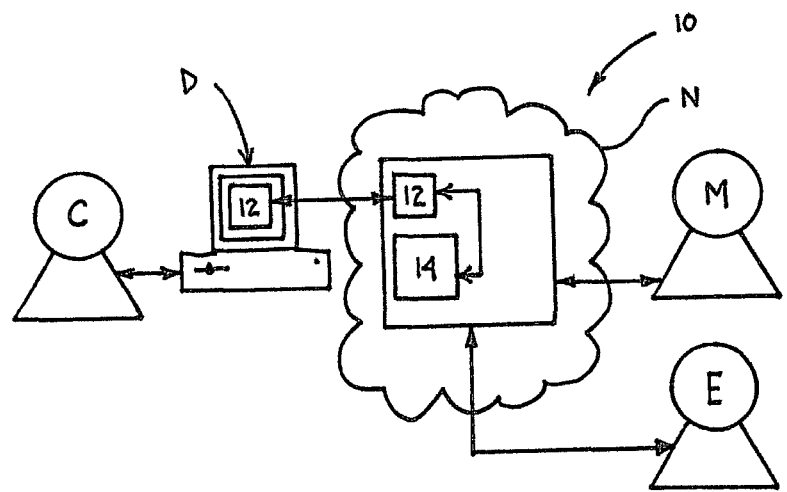
FIG. 1 is a schematic view of one embodiment of a system for facilitating a transaction between a merchant and a consumer according to the principles of the present invention.

In one preferred and non-limiting embodiment, the system 10 includes at least one transaction portal 12 located in the network environment N. This transaction portal 12 is configured for display on the computer D of the consumer C, as illustrated in FIG. 1. Further, the transaction portal 12 is associated with one or more consumer affinities, as set forth above. Therefore, this transaction portal 12 is constructed in the form of displayable data, e.g., a web page, an online location, an online domain and/or a specified network location, etc. In a preferred and non-limiting embodiment, the transaction portal 12 is a web page (noiiiially including multiple, layered displayable pages) located at a specified domain on the Internet. The transaction portal 12 is associated with or part of the consumer affinity, e.g., the entity E. Accordingly, the transaction portal 12 may be the online location or web page of the entity E.

The system 10 also includes a communication system 14 for facilitating the transmission of data between the transaction portal 12, the merchants M, the consumers C and/or the entities E associated with the consumer affinity, etc. This communication system 14 allows for the communication and data transmission in the network environment N. In this manner, the various users of the system 10 and transaction portal 12 may engage in a variety of online transactions and interactions.

The transaction portal 12 represents or embodies the consumer affinity, such as in the form of a branded or entity-specific website. Therefore, like-minded consumers C use the online location of the entity E for entity-based activities, as well as a starting point for online transactions and shopping. For example, the consumer C may be part of a group or association, and this consumer C is encouraged to shop or use the affiliated transaction portal 12 for use in engaging in transactions in the network environment N. In return, the entity E may receive a percentage of the transaction amount, a portion of the proceeds from the transaction, a donation, a fee, money, a benefit and/or sponsorship, etc.

In this manner, the consumer C benefits by supporting their chosen entity E. The merchant M benefits by obtaining repeat customers and actual sales/revenues. Further, the entity E receives some benefit from the system 10 or transaction between the consumer C and the merchant M. Accordingly, all parties in the system 10 of the present invention receive some benefit from the use and implementation of the transaction portal 12 for engaging in transactions.

Figure 2:
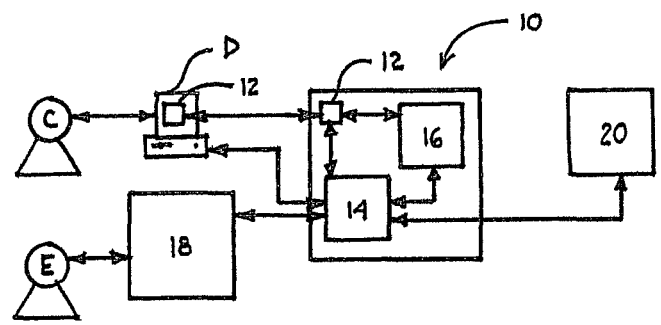
FIG. 2 is a schematic view of another embodiment of a system for facilitating a transaction between a merchant and a consumer according to the principles of the present invention.

As seen in FIG. 2, in order to facilitate the transaction between the merchant M and the consumer C, the system 10 may further include a transactional system 16. This transactional system 14 may be part of or integrated with the system 10 and is programmed to: (1) initiate the transaction between the parties in the network environment N; (2) facilitate the transaction between the parties in the network environment N; and/or (3) consummate the transaction between the parties in the network environment N. This transactional system 16 operates to allow for an effective transaction between the parties, and is in communication with the communication system 14, such that all necessary parties can transmit and receive the data appropriate to them.

As also illustrated in FIG. 2, the entity E may operate an entity system 18 in the network environment N. This entity system 18 is the online location, web page or similar system for allowing the entity E to engage with or interact with the consumers C, merchants M, credit issuers CI and/or transaction portal 12, etc. Similarly, due to the nature of the implementation in the network environment N, the merchant system 20 may also be used. This merchant system 20 allows the merchant N to engage in online transactions with the consumer C, the credit issuer CI, the entity E or within the system 10 and transaction portal 12. Accordingly, in this preferred and non-limiting embodiment, the entity system 18 and the merchant system 20 are both in communication with the system 10 and parties within the system using the communication system 14. It is further envisioned that both the entity system 18 and the merchant system 20 are back-end architectures that allow for this discrete processing of transactions, transactional data and other business activities. In addition, these systems 18, 20 may be used to display, present or serve the respective web page or other online location of the entity E and/or merchant M.

As discussed above, the transaction portal 12 may be part of or integrated with the web page of the entity E in the entity system 18. However, it is also envisioned that the transaction portal 12 represents a link from the web page of the entity E, is downloadable or otherwise executable on the web page of the entity E or, alternatively, the consumer C is referenced to or redirected to the transaction portal 12 at a different location in the network environment N, e.g., at a third-party, hosted system or domain location.

Figure 3:
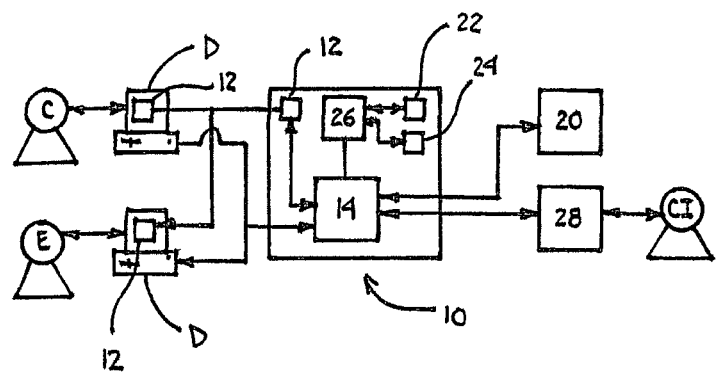
FIG. 3 is a schematic view of a further embodiment of a system for facilitating a transaction between a merchant and a consumer according to the principles of the present invention.

Another further and non-limiting embodiment is illustrated in FIG. 3. In this embodiment, the system 10 also includes a transaction database 22. This transaction database includes transaction data, merchant data, consumer data, credit issuer data, credit product data, consumer affinity data and/or tracking data, etc. In addition, in this embodiment, an affinity database 24 is provided. This affinity database 24 includes consumer affinity data, matching data, entity data, cause data, affiliation data, organization data, concept data, benefit data, association data, sponsor data, percentage data, portion data, donation data, fee data, money data, benefit data and/or sponsorship data, etc. Accordingly, the transaction database 22 and the affinity database 24 include the necessary data points and fields in order to effectively implement the various functions and operating features of the system 10.

In another preferred and non-limiting embodiment, the system 10 includes program instructions, as implemented or executed on a processor 26 in communication with the transaction database 22 and the affinity database 24. This processor 26 is configured to determine a percentage of the transaction amount, determine a portion of the proceeds from the transaction, determine a donation amount, determine a fee amount, determine a monetary amount, determine a benefit and/or determine a sponsorship amount, etc. Specifically, based upon the data in the transaction database 22 and the affinity database 24, the processor 26 is capable of determining which benefit should be assigned or is transferable to the entity E, whether through the computer D of the entity E or the entity system 18.

Accordingly, the program instructions or processor 26 are effective to transmit or communicate the benefit or amount established for the entity E from the transaction portal 12 (or system 10) to the entity E associated with the consumer affinity. This transfer may be a monetary transfer or instructions that allow for such a monetary or benefit transfer to the entity E, where the benefit to the entity E is based upon the transaction, a data point in the transaction database 22 and/or a data point in the affinity database 24, etc.

As also illustrated in FIG. 3, and in another preferred and non-limiting embodiment, the transaction is a credit-based transaction between the merchant M and the consumer C. In such a situation, the transaction portal 12 is in communication with a credit system 28 of the credit issuer CI. Of course, it is also envisioned that the credit issuer CI may be associated with the consumer affinity, or act as the entity E. Still further, in another embodiment, it is the credit issuer CI that is responsible for transmitting or otherwise providing the benefit or monetary amount to the entity E based upon this credit-based transaction. In such an example, the transaction portal 12 may allow the consumer C to "sign up" for a credit product of the credit issuer CI, which would then provide some benefit to the entity E based upon the new account of the consumer C.

In a further preferred and non-limiting embodiment, the system 10 and in particular the transaction portal 12, requires some consumer membership or other affiliation with either the transaction portal 12, the entity E and/or the entity system 18. In this regard, the system 10 may include a membership database 30 that includes membership data, member data, user data, terms data, conditions data, status data and/or payment data, etc. In addition, the transaction portal 12 includes a payment interface 32 which permits, for example, the payment of a membership fee by the merchant M and/or consumer C, etc. In this manner, the merchant M and/or the consumer C becomes a paying member of the transaction portal 12, and it is envisioned that a portion or all of this fee may also benefit the entity E.

As also illustrated in FIG. 4, and in this preferred and non-limiting embodiment, the program instructions or processor 26 may also be configured to communicate information to the member (or user) based upon data in the membership database 30, and through the communication system 14. For example, this information may be in the form of a notification 34 of the location of the transaction portal 12 or other similar "membership" data. In this manner, the entity E may directly or indirectly provide some notification 34 to the member (or consumer C) requesting that the member use the transaction portal 12, or has the option of using the transaction portal 12. For example, the membership may include not only the benefits of belonging to the entity E, but also the benefit of using the transaction portal 12 in furtherance of the consumer affinity.

As discussed, the merchant M may also be required to be a member of the system 10 for use in displaying their products or services on the transaction portal 12. Accordingly, it is further envisioned that the merchant M, or merchant system 20, provide some membership fee or other payment to be part of the transaction portal 12, and this payment, or a portion thereof, would also be transmitted to the entity E in furtherance of the consumer affinity.

As discussed above, the transaction portal 12 may be implemented in a variety of applications. For example, the transaction portal 12 may be in an Internet-based network environment, in the form of a downloadable program, in the form of an executable program, in the form of an application service provider model, in the form of a scripted program, in the form of a remotely accessible program and/or in the form of a user interface, etc. This allows the consumer C, the entity E, the merchant M and the credit issuer CI to interact with the system 10 from various remote locations using a network-enabled computer D. Of course, the system 10 includes the appropriate program instructions to implement the various functions and activities discussed above.

In a further preferred and non-limiting embodiment, the transaction portal 12 is accessible over the network environment N from a network-enabled computing device 36, as illustrated in FIG. 5. Specifically, in this figure, the network-enabled computing device 36 is a kiosk 38, which may be situated in a publicly-accessible area. In one example, the kiosk 38 is placed in a public area with high consumer traffic, where the consumers C having periodic "downtimes" or waiting periods, e.g., an airport, a bus station and/or a train station, etc. This would allow the consumer C to access, interact with and otherwise engage the transaction portal 12 and place orders or otherwise purchase goods and services from the merchant M during these waiting periods.

In another aspect of the present system 10, the above-discussed affinity database 24 is utilized. In this embodiment, the affinity database 24 is used in connection with a merchant database 40. This merchant database 40 includes merchant data, credit issuer data, credit product data, consumer affinity data, target data and/or matching data, etc.

In this embodiment, the system 10 further includes programming instructions (or processor 42) for establishing a relationship between at least one merchant M and the entity E associated with the consumer affinity. This establishment is based upon data in the affinity database 24 and the merchant database 40. In this manner, the system 10 allows for the appropriate matching of merchants M with entities E either based upon the consumer affinity and/or the merchant M business plan, etc. The transaction portal 12 is then constructed for use by the matched merchant M or merchants M for presentation to the consumers C.

In a further embodiment, the transaction portal 12 is in the form of a network transaction interface 44. This transaction interface 44 is presentable to a user or consumer C. For example, in one preferred and non-limiting embodiment, the transaction interface 44 is in the form of at least one web page 46 for the presentation of data in various predetermined areas 48 on the page 46.

As seen in FIG. 7, an exemplary web page 46 is provided and includes various areas 48 for presenting data and/or links to the user. In this embodiment, the areas include branded portions or links 50, terms and/or conditions portions or links 52, transaction portions or links 54, catalog portions or links 56, merchant portions or links 58, payment portions or links 60, link portions or links 62, informational portions or links 64, login portions or links 66 and search portions or links 68.

As seen in the example of FIG. 7, the branded portions or links 50 may include a welcome message, as well as identification of the entity E or consumer affinity. In addition, the branded portions or links 50 may indicate that the consumer C has accessed the transaction portal 12 affiliated with or associated with the consumer affinity or entity E. The terms and conditions portion or links 52 are used to present the consumer C with the terms and conditions of the transaction portal 12, the membership with the entity E or transaction portal 12 and/or the credit product or credit issuer CI, etc. Normally, these portions or links 52 are provided when the consumer C is not already a member, i.e., a new account on the transaction portal 12.

The transaction portions or links 54 or "Let's Shop" link allows the consumer C to enter the areas in which products or services may be purchased and/or browsed, etc., and where the transaction may be initiated, engaged in or consummated. For example, this portion or link 54 may move or direct the consumer C to an area of the system 10 controlled by or otherwise in communication with the transaction system 16. The catalog portions or links 56 may either provide a catalog to the consumer C of the products of a specific merchant M, and it is also envisioned that these portions or links 56 may be used to redeem a benefit or provide or choose the benefit that is given to or transmitted to the entity E. For example, the consumer C may have a list of benefits, consumer affinities or entities E to which the benefit may be provided. In this example, the transaction portal 12 may be modeled or programmed on a user-specific basis.

For example, a group of merchants M may offer goods and services to the consumer C, and this group of merchants M may be part of or affiliated with multiple entities E or consumer affinities. In this manner, the consumer C may "break up" his or her transaction and provide benefit to various entities, e.g., various charities or other consumer affinities. This allows consumer C to allocate some or all of the benefit derived from transacting on the transaction portal 12 to multiple entities E or consumer affinities. Accordingly, these links or portions 56 may be considered "redemption" areas where the consumer C directs the benefit that arises from the transaction.

The merchant portions or links 58 represent a listing of merchants M that are associated with or affiliated with the entity E that supports or is otherwise affiliated with the transaction portal 12. Of course, as discussed above, a single merchant M may be affiliated with multiple entities E or consumer affinities, and thereby appear on one or multiple listings of merchants M at the transaction portal 12. The payment portions or links 60 serve as the "shopping cart" for allowing the consumer C to interact with the merchant M and/or the credit issuer CI. It is envisioned that these portions or links 60 may also refer the consumer C to the payment interface 32 discussed above in connection with the membership feature. However, a separate and distinct payment system may be used to allow for the secure, online payment involved with the transaction.

The links portions or links 62 may provide links to various friends or supporters of the entity E. For example, the consumer C may move to other online locations of associated or affiliated entities E or consumer affinities, as well as to other transaction portals 12. In this manner, a network of entities E or consumer affinities can be built, where the individual entities E have mutual goals and paths. The informational portions or links 64 would provide the consumer C with information regarding the transaction portal 12. Of course, other information may be presented or provided to the user, such as advertising data, marketing materials and/or entity E or consumer affinity information, etc.

Under the login portions or links 66, existing members are able to enter the transaction portal 12, or otherwise use various extended features or functions of the transaction portal 12, by logging into the system 10. As is known in the art, the member or user would simply enter his or her username and password. It is also envisioned that this username and password can be used in connection with this or other web pages 46 affiliated with the system 10 or the entity E. Finally, the search portions or links 68 may refer the user to a search engine and allow the user to construct an appropriate search for various and desired products and/or services. The various features of the search engine allow the user to sort through and identify specific data from a large quantity of data, as is known in the art.

The presently-invented system 10 and method is beneficial in many different applications. For example, the entity E may be a charitable foundation, where the actual membership is quite large, as compared to daily users of the Internet or the website of the entity E. However, the members are part of the charitable foundation in order to provide money or other benefits thereto. Therefore, the present system 10 builds a transaction portal 12 for use by the members, and brands this transaction portal 12 around the charitable foundation. It is understood by the members that when they use the transaction portal 12, the charitable foundation gets a benefit, such as a portion or commission of the sale. The charitable foundation would notify members and ask that they use the transaction portal 12, as it is equivalent to donating to the foundation. In one example, the charitable foundation receives 2-4% of the gross sale or transaction on a transaction-by-transaction basis. In addition, the charitable foundation may "pitch" the use of this transaction portal 12 in normal donor literature, whether electronic or paper documents.

In another example, the transaction portal 12 may be branded around an airline miles program. For example, all transactions that are consummated through the transaction portal 12 provide or accrue "miles" for the consumer C. The benefit to the airline would be the revenue or specified percentage of transaction received from the merchant M for allowing the merchant M to be part of the transaction portal 12 or specifically advertised thereon. In addition, the merchant M has an incentive to direct consumers C to the transaction portal 12, as these consumers C have an extra incentive to consummate transactions through the system 10, whether providing a benefit to the entity E or receiving a benefit to themselves.

Another example of the system 10 of the present invention is in the case where the consumer affinity or entity E is an abstract notion or desire. For example, it may be determined that one of the largest drawbacks in the e-tailing marketplace is the high shipping charges. Accordingly, the consumer affinity is to eliminate a negative aspect of the transaction, e.g., the shipping charges. Therefore, the transaction portal 12 in this example would be branded around free shipping. Consumers C that make the avoidance of shipping charges a high priority would have an incentive to use this transaction portal 12, and again, the incentive of the merchant M is increased sales activity and volume.

As discussed above, a system 10 and transaction portal 12 may be on a membership basis. In one example, the consumer C is able to use the transaction portal 12 free for a certain amount of time, e.g., a year, and thereafter an annual or other similar fee must be paid. Of course, such a fee may be based upon consumer C use and/or business activity, etc. In addition, in order to be advertised on the transaction portal 12 or offer the products and/or services, it is further envisioned that the merchant M pay some membership fee. This model also may be transferred to the credit issuer CI, where the credit issuer CI is capable of advertising or exclusively using a specified credit product within the system 10 and on the transaction portal 12 through a membership or similar model.

Another example of the system 10 and method according to the present invention is where the consumer affinity is a cause, e.g., carbonless shopping, environmentalism, political funding, and other conceptual causes. For example, in the area of environmental protection, the entity may be a fund or purchaser of carbon offsets, where a percentage of the transaction or sale is provided to this entity based upon the consumer's C sales activity. The entity E would then use this monetary donation to buy additional carbon offsets, thereby providing the consumer C with the assurance that their sales activities are actually benefiting the environment. In addition, the entity E may provide some notification or other message to the consumer C indicating the benefit they provided, e.g., "You have helped to plant an acre of trees".

Yet another example of the system 10 and method of the present invention is where the entity E is an individual to be sponsored. In one alternative, such an individual may be engaging in an activity, e.g., running a race, playing a sport and/or engaging in some physical activity, etc., where the individual is looking for sponsors and/or donations. Normally, such donations and monies are provided to a charitable group that is conducting the event. Accordingly, in this example, when a consumer C (perhaps a friend or acquaintance of the individual) conducts a transaction using the transaction portal 12, the benefit, donation or other sponsorship monies are provided either to the participating individual or the sponsoring organization as allocated to the participating individual. Therefore, the individual obtains credit for receiving a certain donation or sponsorship amount, while the consumer C is benefiting both the participating individual and the sponsoring organization simply through the use of the presently-invented system 10. Any number of such variations are envisioned, where the eventual benefit is received by the entity E (whether directly or indirectly), where the consumer C is assisting and providing this benefit by using the transaction portal 12 and system 10.

Of course, the system 10 and method of the present invention may be used in a variety of applications, such as non-profit organizations, universities, alumni organizations, conceptual ideas and/or profit-based businesses, etc. The system 10 represents a new way to connect value consumer's C with merchants M in an incentive structure.

In this manner, the system 10 and method of the present invention facilitate a transaction between consumers C and merchants M that focuses on specific consumer sets or affiliations. The present invention also provides valuable leads to merchants M and/or assists in the better conversion of leads to actual sales. In addition, the method and system 10 of the present invention facilitates transactions that target specified and affiliated consumers C and/or benefits specific merchants M. Still further, the present invention represents a new advertising mechanism and model for merchants M based upon an affiliated or like-minded consumer C base. Overall, the method and system 10 of the present invention provide a new context for transactions between consumers C and merchants M, where the consumer C, the merchant M, the credit issuer CI and the entity E all benefit from the transactional process.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system comprising:
   a non-transitory memory; and
   one or more hardware processors in communication with the non-transitory memory and configured to read machine-executable instructions from the non-transitory memory to cause the system to perform operations comprising:
   transmitting, over a network connection, a communication to a device, causing a presentation of a transaction portal associated with a consumer affinity entity, the transactional portal comprising:
     a transaction portion configured to allow a user to select items for a transaction, the transaction portion generated by accessing merchant data from a transaction database;
     a catalog portion configured to set or modify affinities of the user, wherein the catalog portion is generated by matching the consumer affinity entity with an affinity of the user based on affinity data accessed from an affinity database, and wherein the catalog portion is configured to receive a user input specifying one or more items of the transaction that confers a benefit to the consumer affinity entity; and
     a payment portion configured to process a transaction and transmit transaction data to a transactional system;
   receiving, over the network connection from the transaction portion, a selection of one or more items associated with a first transaction;
   receiving, over the network connection from the catalog portion, a selection of at least one of the one or more items; and
   determining a benefit for the consumer affinity entity in response to the selection of the at least one of the one or more items from the catalog portion.

2. The system of claim 1, wherein the benefit is for a specific consumer affinity entity from a plurality of consumer affinity entities.

3. The system of claim 1, wherein the operations further comprise:
   matching the merchant to the consumer affinity entity using the affinity data.

4. The system of claim 1, wherein the consumer affinity entity is the merchant and the merchant is identified based on a merchant business plan.

5. The system of claim 1, wherein the benefit for the consumer affinity entity is paid by the merchant.

6. The system of claim 1, wherein the device is a kiosk.

7. The system of claim 1, wherein the benefit includes a monetary percentage of a transaction amount.

8. A method comprising:
   presenting, on a display of a device, a transaction portal associated with a consumer affinity entity, wherein the transactional portal comprises:
     a transaction portion configured to allow a user to select items for a transaction, the transaction portion generated by accessing merchant data from a transaction database;
     a catalog portion configured to set or modify affinities of the user, wherein the catalog portion is generated by matching a consumer affinity entity with an affinity of the user based on affinity data accessed from an affinity database, and wherein the catalog portion is configured to receive a user input specifying one or more items of the transaction that confers a benefit to the consumer affinity entity; and
     a payment portion configured to process a transaction and transmit transaction data to a transactional system;
   accessing, via a first user input on the display of the device, an item for purchase from a merchant affiliated with the consumer affinity entity through the transaction portion;
   transmitting, over a network connection, a selection of the item from the merchant;
   receiving a user request to access the catalog portion;
   receiving, via a second user input on the display of the device, a selection of the item from the catalog portion; and
   presenting, on the display of the device, a notification indicating a benefit for the consumer affinity entity, the benefit presented determined in response to the transaction for purchase.

9. The method of claim 8, wherein the benefit is determined for a specific consumer affinity entity from a plurality of consumer affinity entities.

10. The method of claim 8, wherein the merchant is matched to the consumer affinity entity using the affinity data.

11. The method of claim 8, wherein the consumer affinity entity is the merchant and the merchant is identified based on a merchant business plan.

12. The method of claim 8, wherein the benefit for the consumer affinity entity is paid by the merchant.

13. The method of claim 8, further comprising receiving, the user, one or more consumer affinity entities for receipt of the benefit.

14. The method of claim 8, wherein the benefit includes a monetary percentage of a transaction amount.

15. A non-transitory machine-readable medium having instructions stored thereon machine-readable instructions executable to cause a machine to perform operations comprising:
   presenting, on a display of a device, a transaction portal associated with a consumer affinity entity, wherein the transactional portal comprises:

a transaction portion configured to allow a user to select items for a transaction, the transaction portion generated by accessing merchant data from a transaction database;

a catalog portion configured to set or modify affinities of the user, wherein the catalog portion is generated by matching a consumer affinity entity with an affinity of the user based on affinity data accessed from an affinity database, and wherein the catalog portion is configured to receive a user input specifying one or more items of the transaction that confers a benefit to the consumer affinity entity; and a payment portion configured to process a transaction and transmit transaction data to a transactional system;

accessing, via a first user input on the display of the device, an item for purchase from a merchant affiliated with the consumer affinity entity through the transaction portion;

transmitting, over a network connection, a selection of the item from the merchant;

receiving a user request to access the catalog portion;

receiving, via a second user input on the display of the device, a selection of the item from the catalog portion; and presenting, on the display of the device, a notification indicating a benefit for the consumer affinity entity, the benefit presented determined in response to the transaction for purchase.

16. The non-transitory machine-readable medium of claim 15, wherein the benefit is determined for a specific consumer affinity entity from a plurality of consumer affinity entities.

17. The non-transitory machine-readable medium of claim 15, wherein the merchant is matched to the consumer affinity entity using the affinity data.

18. The non-transitory machine-readable medium of claim 15, wherein the consumer affinity entity is the merchant and the merchant is identified based on a merchant business plan.

19. The non-transitory machine-readable medium of claim 15, wherein the benefit for the consumer affinity entity is paid by the merchant.

20. The non-transitory machine-readable medium of claim 15, wherein the operations further comprise receiving, from the user, one or more consumer affinity entities for receipt of the benefit.

* * * * *

UNITED STATES PATENT AND TRADEMARK OFFICE
CERTIFICATE OF CORRECTION

PATENT NO. : 10,217,124 B2
APPLICATION NO. : 15/444202
DATED : February 26, 2019
INVENTOR(S) : Thomas H. Keithley Page 1 of 1

It is certified that error appears in the above-identified patent and that said Letters Patent is hereby corrected as shown below:

In the Specification

In Column 4, Line 31, change "affmity" to --affinity--.

In Column 4, Line 48, change "noiiiially" to --normally--.

Signed and Sealed this
Seventh Day of May, 2019

Andrei Iancu
*Director of the United States Patent and Trademark Office*